United States Patent
Goebel

[11] 3,862,118
[45] Jan. 21, 1975

[54] TETRAKISAZO COMPOUNDS

[75] Inventor: Hermann Goebel, Leverkusen, Germany

[73] Assignee: Bayer Aktiengesellschaft, Leverkusen, Germany

[22] Filed: Aug. 4, 1972

[21] Appl. No.: 278,089

[30] Foreign Application Priority Data
Aug. 5, 1971 Germany.............................. 2139148

[52] U.S. Cl.................. 260/166, 260/169, 260/189, 260/194
[51] Int. Cl. ...................... C09b 31/16, C09b 31/30
[58] Field of Search............................ 260/166, 168

[56] References Cited
UNITED STATES PATENTS
2,106,876  2/1938  Schubert............................ 260/168
2,263,894  11/1941  Sparks............................ 260/166 X Primary Examiner—Lorraine A. Weinberger
Assistant Examiner—C. F. Warren
Attorney, Agent, or Firm—Plumley & Tyner

[57] ABSTRACT

Compounds which in the form of the free acid correspond to the formula

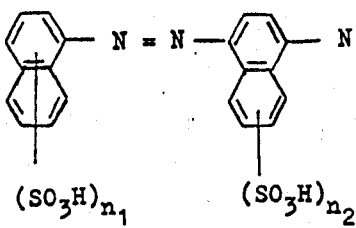

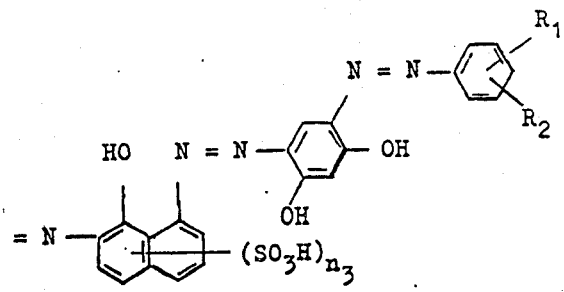

wherein $R_1$, $R_2$, $n_1$, $n_2$ and $n_3$ have the meaning given in the description. The new dyestuffs dye vegetable and animal fibre materials and are particularly well suited for dyeing and printing of leather. They show good fastness properties, such as e.g., resistance to acid, resistance to alkalies, resistance to formaldehyde, resistance to solvents, resistance to fat-liquoring, or dyeability in hard water; in particular the good fastness to light of the dyestuffs is to be stressed.

4 Claims, No Drawings

TETRAKISAZO COMPOUNDS

The subject of the present invention are new azo dyestuffs which in the form of the free acid correspond to the formula

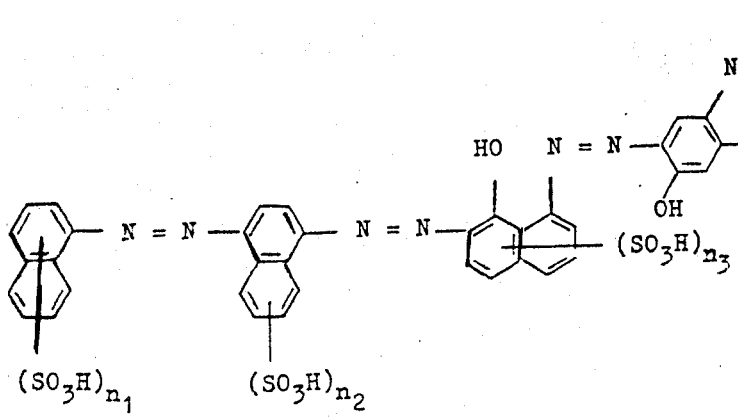

wherein
- $R_1$ represents — a halogen atom, a nitro, cyano, sulphonic acid, carboxylic acid, acyl or acylamino group,
- $R_2$ — hydrogen, halogen, an alkyl, alkoxy or sulphonic acid group,
- $n_1$ — an integer 0, 1, 2 or 3,
- $n_2$ — an integer 0 or 1 and
- $n_3$ — an integer 1 or 2 as well as their production and use.

As halogen atoms there may be mentioned in particular Cl and Br.

Suitable acyl groups $R_1$ are alkyl carbonyl, alkoxy carbonyl and alkyl sulphonyl radicals each with 2 – 5 C atoms.

Suitable alkyl radicals $R_2$ are methyl and ethyl radicals.

Suitable alkoxy radicals $R_2$ are methoxy, ethoxy, propoxy and butoxy radicals.

Particularly preferred dyestuffs of the formula I are such in which $R_1$ represents a nitro group and $R_2$ hydrogen, methyl, methoxy or —SO$_3$H.

The new dyestuffs are obtained in that an aminomonoazo dyestuff which in the form of the free acid corresponds to the formula

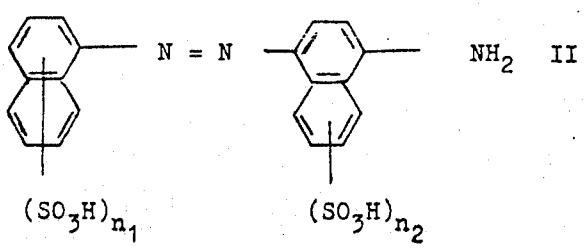

wherein
- $n_1$ represents — 0, 1, 2 or 3 and
- $n_2$ — 0 or 1, is diazotised, then coupled onto an aminonaphthol sulphonic acid of the formula

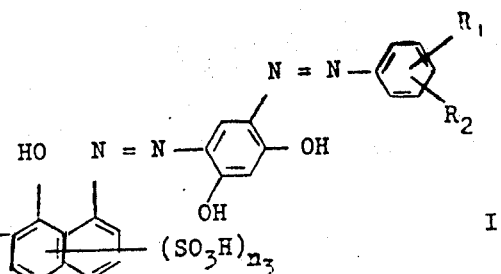

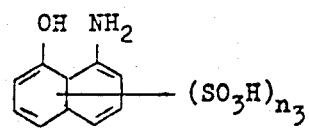

wherein
$n_3$ represents 1 or 2, in that the resulting aminodisazo dyestuff is further diazotised and coupled with 1,3-dihydroxy benzene and finally the resulting trisazo dyestuff which in the form of the free acid corresponds to the formula

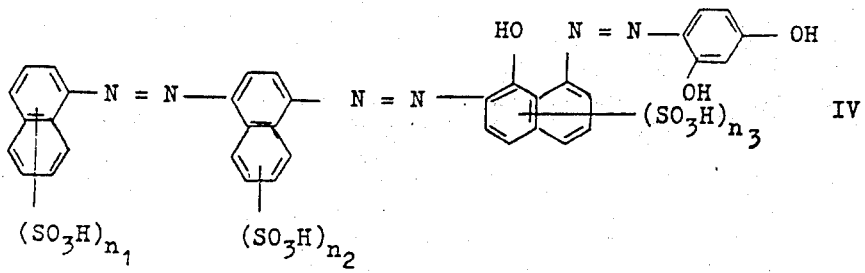

wherein
- $n_1$ represents — 0, 1, 2 or 3
- $n_2$ — 0 or 1 and
- $n_3$ — 1 or 2 combined with a diazotised aniline of the formula

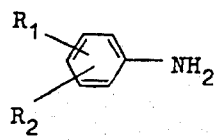

The aminomonoazo dyestuffs of the formula II are described as intermediate or end products, for example, in Chem. Ber.21, 3265 (1888) and the German Pat. specifications 73901, 83572, 84460 and 99501 as well as 122066.

Suitable aminonaphthol sulphonic acids of the formula III are 1-amino-8-naphthol-3,6-disulphonic acid, 1-amino-8-naphthol-4,6-disulphonic acid and 1-amino-8-naphthol-4-sulphonic acid.

Suitable anilines of the formula V are 2-, 3- and 4-nitroaniline, 2-, 3- and 4-chloroaniline, 2-, 3- and 4-bromoaniline, 2-, 3- and 4-sulfanilic acid, dichloroanilines such as e.g., 2,4-dichloroaniline or 2,5 dichloroaniline, 2-methoxy-4-nitroaniline, 2-methoxy-5-nitroaniline, 2-methyl-4-nitroaniline, 4-carboxyaniline, 4-carboethoxyaniline, 4-acetyl-aminoaniline.

The new dyestuffs dye vegetable and animal fibre materials olive. They are particularly well suited for dyeing and printing of leather. They show good fastness properties, such as e.g., resistance to acid, resistance to alkalies, resistance to formaldehyde, resistance to solvents, resistance to fat-liquoring, or dyeability in hard water; in particular, the good fastness to light of the dyestuffs is to be stressed.

EXAMPLE 1

22.3 g of 1-amino-napthalene-5-sulphonic acid are diazotised in a known manner and coupled in a weakly acid medium onto 22.3 g of 1-amino-naphthalene-7-sulphonic acid. After completion of coupling the aminoazo dyestuff is further diazotised in a known manner and reacted in the alkaline region with 31.9 g of 1-amino-8-naphthol-3,6-disulphonic acid to produce the diazo dyestuff. The amino-diazo dyestuff is further diazotised and coupled in the presence of alkali onto 11.0 g of 1,3-dihydroxy benzene. Finally, 13.8 g of diazotised p-nitroaniline are allowed to act on this trisazo dyestuff. The dyestuff which precipitates by the addition of sodium chloride is easily soluble in water and dyes cotton, but especially leather, olive. The dyeings possess good fastness properties.

If instead of p-nitroaniline the diazo compounds of m- or o-nitroaniline or 1-amino-2-methoxy-4 or 5-nitro-benzene or 1 amino-4-nitro-2-sulphonic acid benzene are used, then dyeings with a similar shade and similar good fastness properties are obtained.

In some cases it is advantageous to carry out one or more intermediate isolation steps and/or to purify the end product by redissolution.

The salting out of the dyestuffs can also be carried out by the addition of other customary electrolytes, such as e.g. potassium chloride or sodium sulphate.

EXAMPLE 2

22.3 g of 1-amino-naphthalene-4-sulphonic acid are diazotised and coupled in a weakly acid medium onto 22.3 g of 1-aminonaphthalene-6-sulphonic acid. After completion of coupling the aminoazo dyestuff is further diazotised in a known manner and reacted in the alkaline region with 31.9 g of 1-amino-8-naphthol-3,6-disulphonic acid. The amino-disazo dyestuff is further diazotised and coupled in the alkaline region onto 11.0 g of 1,3-dihydroxy benzene. Finally, 13.8 g of diazotised p-nitroaniline are coupled onto this trisazo dyestuff. The dyestuff which precipitates by the addition of sodium chloride is easily soluble in water and dyes cotton, but in particular leather, olive. The dyeings possess good fastness properties, for example, good fastness to light.

1-amino-naphthalene-4-sulphonic acid can also be replaced, for example, by 1-amino-naphthalene-5-sulphonic acid or 1-amino-8-naphthol-3,6-disulphonic acid by 1-amino-8-naphthol-4,6-disulphonic acid or 1-amino-8-naphthol-4-sulphonic acid by 1-amino-8-naphthol-2,4-disulphonic acid finally, p-nitroaniline by m- or o-nitroaniline or derivatives of these. In every instance valuable olive-coloured dyestuffs with only slight differences in shade are obtained whose dyeings on leather are distinguished by good fastness properties, for example, good fastness to light.

The large number of possible combinations which are found when the basic structure of the dyestuff is retained and only the positions of sulpho groups or nitro groups and further substituents in the end component changed may be seen from the following Table in which only a few examples are given.

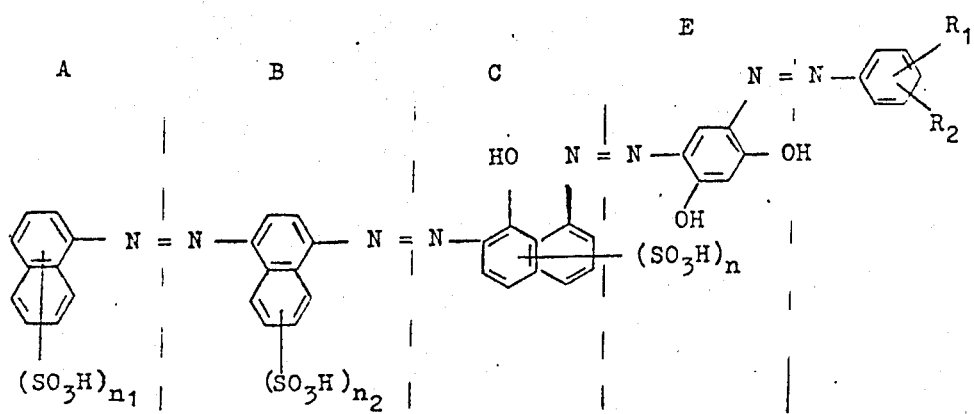

| Component A | Component B | Component C | Component E | Shade |
|---|---|---|---|---|
| 1-amino-naphthalene-4-sulphonic acid | 1-amino-naphthalene-6-sulphonic acid | 1-amino-8-naphthol-3,6-disulphonic acid | 1-amino-4-nitro-benzene | olive |
| 1-amino-naphthalene-5-sulphonic-acid | 1-amino-naphthalene 6-sulphonic-acid | 1-amino-8-naphthol-3,6-disul-phonic acid | 1-amino-4-nitro-ben-zene | olive |

—Continued

| Component A | Component B | Component C | Component E | Shade |
|---|---|---|---|---|
| 1-amino-naphthalene-5-sulphonic acid | 1-amino-naphthalene-6-sulphonic acid | 1-amino-8-naphthol-4,6-disulphonic acid | 1-amino-4-nitro-benzene | olive |
| 1-amino-naphthalene-4-sulphonic acid | 1-amino-naphthalene-7-sulphonic acid | 1-amino-8-naphthol-3,6-disulphonic acid | 1-amino-4-nitro-benzene | olive |
| 1-amino-naphthalene-4-sulphonic acid | 1-amino-naphthalene-6-sulphonic acid | 1-amino-8-naphthol-3,6-disulphonic acid | 1-amino-3-nitro-benzene | olive |
| 1-amino-naphthalene-4-sulphonic acid | 1-amino-naphthalene-7-sulphonic acid | 1-amino-8-naphthol-3,6-disulphonic acid | 1-amino-3-nitro-benzene | brownish olive |
| 1-amino-naphthalene-3,6-disulphonic acid | 1-amino-naphthalene-6-sulphonic acid | 1-amino-8-naphthol-3,6-disulphonic acid | 1-amino-4-nitro-benzene | brownish olive |
| 1-amino-naphthalene-4-sulphonic acid | 1-amino-naphthalene-6-sulphonic acid | 1-amino-8-naphthol-4-sulphonic acid | 1-amino-4-nitro-benzene | olive |
| 1-amino-naphthalene-4-sulphonic acid | 1-amino-naphthalene-6-sulphonic acid | 1-amino-8-naphthol-2,4-disulphonic acid | 1-amino-4-nitro-benzene | olive |
| 1-amino-naphthalene-5-sulphonic acid | 1-amino-naphthalene-6-sulphonic acid | 1-amino-8-naphthol-3,6-disulphonic acid | 1-amino-2-methoxy-4-nitro-benzene | olive |
| 1-amino-naphthalene | 1-amino-naphthalene-6-sulphonic acid | 1-amino-8-naphthol-3,6-disulphonic acid | 1-amino-4-nitro-benzene | olive |
| 1-amino-naphthalene-3,6-disulphonic acid | 1-amino-naphthalene | 1-amino-8-naphthol-3,6-disulphonic acid | 1-amino-4-nitro-benzene | olive |
| 1-amino-naphthalene-4-sulphonic acid | 1-amino-naphthalene-7-sulphonic acid | 1-amino-8-naphthol-4,6-disulphonic acid | 1-amino-2-methoxy-5-nitro-benzene | olive |
| 1-amino-naphthalene-4-sulphonic acid | 1-amino-naphthalene-7-sulphonic acid | 1-amino-8-naphthol-4,6-disulphonic acid | 1-amino-3-nitro-benzene | brownish olive |
| 1-amino-naphthalene-3,6-disulphonic acid | 1-amino-naphthalene-6-sulphonic acid | 1-amino-8-naphthol-3,6-disulphonic acid | 1-amino-2,4-dichloro-benzene | olive |
| 1-amino-naphthalene-3,6-disulphonic acid | 1-amino-naphthalene-6-sulphonic acid | 1-amino-8-naphtol-3,6-disulphonic acid | 1-amino-3-nitro-benzene | olive |
| 1-amino-naphthalene-3,6-disulphonic acid | 1-amino-naphthalene-6-sulphonic acid | 1-amino-8-naphthol-3,6-disulphonic acid | 1-amino-2-nitro-benzene | olive |

I claim:
1. Compound which in the form of the free acid has the formula
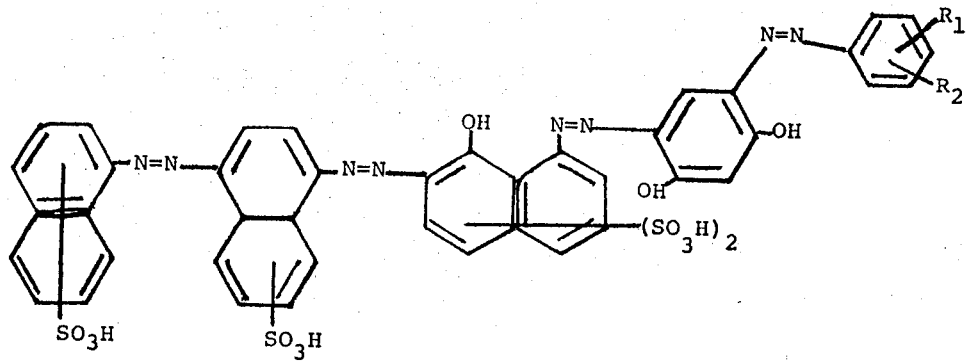
wherein
R₁ is nitro and R₂ is hydrogen or methoxy.
2. Compound of the formula
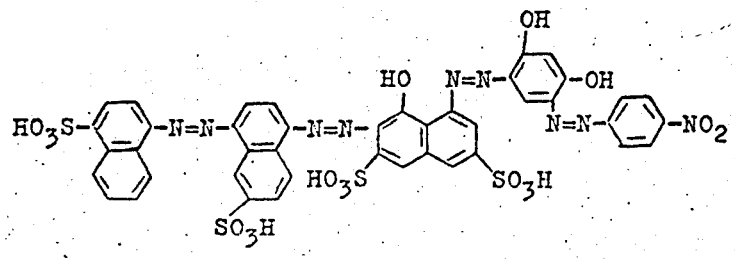
3. Compound of the formula
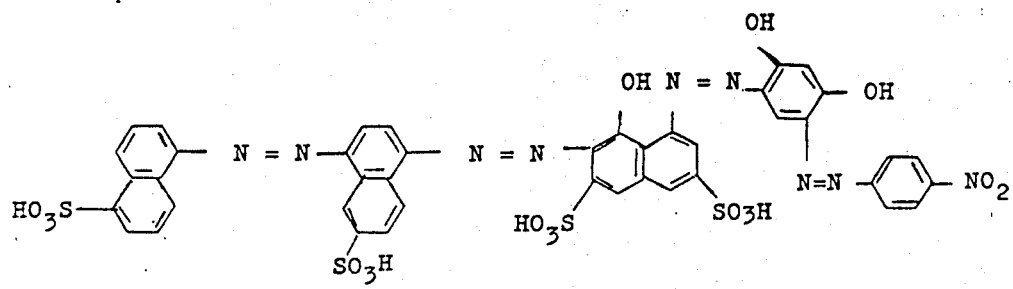
4. Compound of the formula
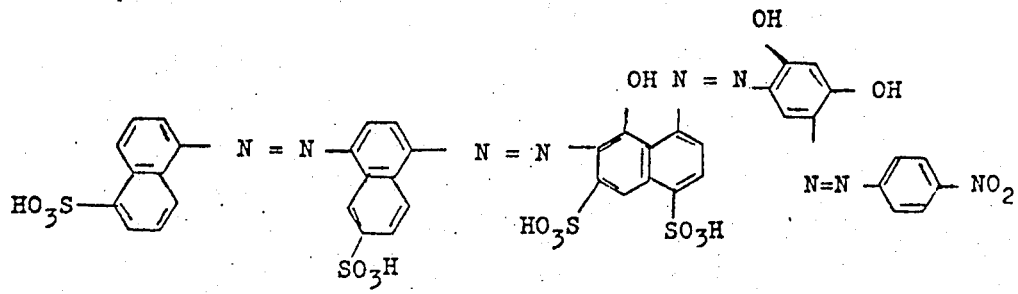
* * * * *